Feb. 10, 1959
J. C. McMULLEN
2,873,197
REFRACTORY FIBROUS MATERIAL
Filed Jan. 21, 1955
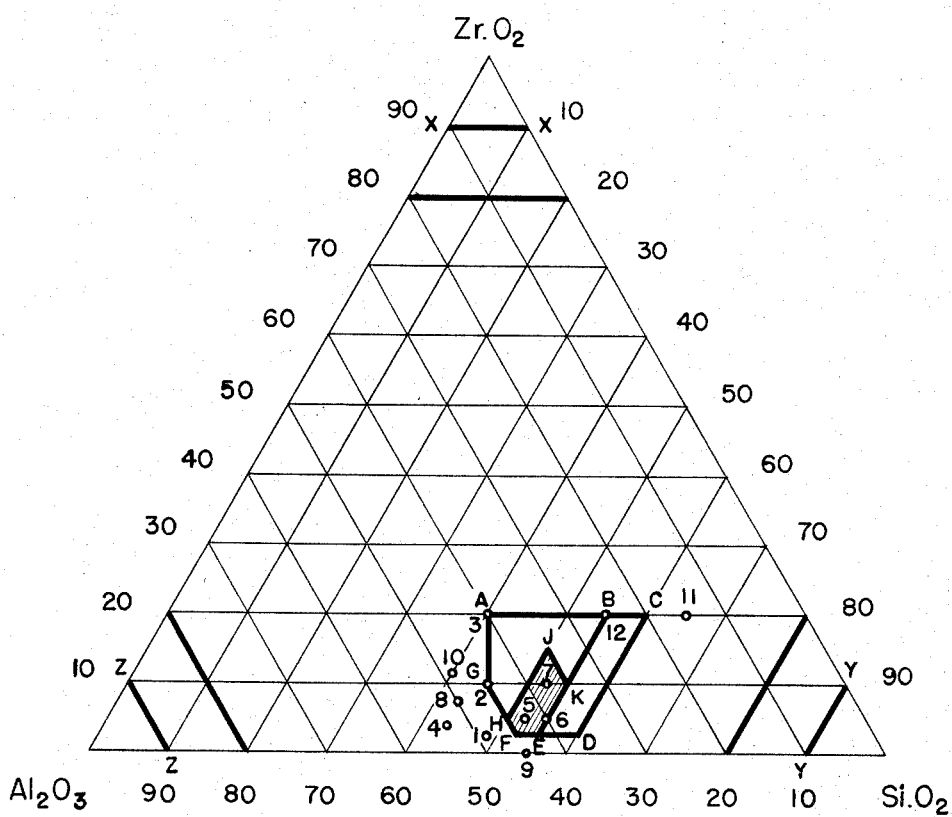
INVENTOR.
JOHN C. Mc. MULLEN.
BY
ATTORNEY

United States Patent Office 2,873,197
Patented Feb. 10, 1959

2,873,197

REFRACTORY FIBROUS MATERIAL

John C. McMullen, Niagara Falls, N. Y., assignor to The Carborundum Company, Niagara Falls, N. Y., a corporation of Delaware Application January 21, 1955, Serial No. 483,371

15 Claims. (Cl. 106—50)

This invention relates to refractory compositions, and particularly to refractory material in fibrous form suitable for use as insulating material and the like at high temperatures, and to compositions for making the same.

There has been a demand for a long time for a ceramic material in fine fibrous form that would be sufficiently refractory to retain its strength and resiliency to a substantial degree when subjected to temperatures in the neighborhood of 2500° F. or higher over protracted periods of time. Obviously, the melting range of such a fibrous material must be substantially over 2500° F.

United States Patent No. 2,557,834 issued to applicant discloses refractory fibrous materials and compositions for making the same, which refractory fibrous materials meet, to a great degree, the above requirement of refractoriness. The preferred compositions of this patent, consisting essentially of 45 to 55 parts by weight of alumina, 55 to 45 parts by weight of silica and 1 to 6 parts by weight borax glass, are extremely suitable for the manufacture of refractory fibrous material by the blowing method. This method of producing inorganic fibers comprises impinging a high velocity stream of gas, such as air or steam, against a falling stream of molten inorganic material thereby fiberizing the inorganic material.

Besides the blowing method for the manufacture of inorganic fibrous material, refractory fibrous material can be made by the method commonly known in the art as the spinning method. This method comprises releasing a stream of molten inorganic material so that it falls onto either a side or the periphery of one or more rapidly rotating discs which throw the molten material off in a tangential direction thereby fiberizing it. The spinning method has certain inherent advantages over the blowing method in that it tends to produce a fibrous material having a higher percentage of long, silky fibers and containing a relatively low percentage of beads and pellets. Whereas blown fiber is seldom satisfactory for uses such as spinning into yarn and forming into strong blankets, fibrous material made by the spinning method is much better adapted for such uses.

Although the preferred compositions of the above-mentioned patent are ideally suited for the manufacture of blown fiber, experience has indicated that these compositions are relatively unsatisfactory for the manufacture of spun fiber. Use of these compositions for making spun fiber gives a relatively poor yield of fibrous material containing an excessive quantity of pellets, which fibrous material contains a relatively low percentage of long fibers and has a relatively high bulk density. Furthermore the average fiber diameter of fiber spun from such compositions is rather large.

It is therefore an object of the present invention to provide ceramic compositions in fibrous form that are highly refractory.

It is a further object of the present invention to provide ceramic compositions that are especially suited for the manufacture of fibrous material by the spinning method.

It is also an object of the present invention to provide superior inorganic fibrous materials.

These and other advantages will become obvious as the description proceeds.

In accordance with the present invention it has been found that inorganic refractory compositions suitable for use at high temperatures can be obtained by melting and fiberizing mixtures of alumina, silica and zirconia. Additionally a minor amount of a modifying agent such as borax glass may be included in the composition.

Specifically it has been found that superior inorganic fibrous material can be made, preferably by the spinning method, from compositions comprising by oxide analysis 40 to 60 parts by weight silica, 20 to 45 parts by weight alumina, and 3½ to 20 parts zirconia with a silica to alumina weight ratio of at least 1. For better yields of small diameter, low bulk density fibrous material, the compositions employed comprise 40 to 55 parts silica, 25 to 45 parts alumina and 3½ to 20 parts zirconia with the silica to alumina ratio by weight being at least 1. For the optimum yield in volume per unit time of the superior fibrous material, the composition is maintained within the preferred range comprising 50 to 55 parts silica, 35 to 45 parts alumina, and 3½ to 15 parts zirconia with a ratio of silica to alumina plus zirconia of at least 1.

If desired, the above-described compositions may contain, in addition to 100 parts by weight total of silica, alumina and zirconia, up to about 6 parts by weight of a modifying agent such as borax glass. The inclusion of such a modifying agent in these compositions does not appear to have any detrimental effect on the quantity of fiber produced and the physical nature thereof.

For a better understanding of the present invention, reference is made to the accompanying drawing showing a triaxial diagram, the three components of which are, reading clockwise on the triangle, zirconia, silica and alumina. The upper point represents 100 percent zirconia, and each horizontal line X—X represents a progressive decrease of 10 percent in the zirconia content. The lower right apex of the triangle diagram denotes 100 percent silica, and each line Y—Y represents a progressive increment of 10 percent decrease in the silica content. The lower left apex of this triangular diagram denotes 100 percent alumina, and each line Z—Z represents a progressive increment of 10 percent decrease in the alumina content.

All the compositions of the present invention have silica, alumina and zirconia contents falliung within polygon ACDFG of the drawing. The compositions giving the better yields have silica, alumina and zirconia contents falling within the polygon ABEFG, whereas the preferred compositions have silica, alumina and zirconia contents falling within the polygon EFHJK. Polygon ACDFG covers those compositions containing by oxide analysis 40 to 60 parts silica, 20 to 45 parts alumina, and 3½ to 20 parts zirconia that have a silica to alumina ratio by weight of at least unity. Compositions within the polygon ABEFG contain by oxide analysis 40 to 55 parts silica, 25 to 45 parts alumina, and 3½ to 20 parts zirconia, with the silica to alumina ratio by weight of at least unity. Compositions within the polygon EFHJK contain by oxide analysis 50 to 55 percent silica, 35 to 45 percent alumina, and 3½ to 15 percent zirconia, with the silica to alumina plus zirconia ratio by weight being at least unity.

Table I below lists the coordinace of the various apexes of the polygons of the drawing:

TABLE I

|   | Alumina | Silica | Zirconia |
| --- | --- | --- | --- |
| A | 40 | 40 | 20 |
| B | 25 | 55 | 20 |
| C | 20 | 60 | 20 |
| D | 36½ | 60 | 3½ |
| E | 41½ | 55 | 3½ |
| F | 45 | 51½ | 3½ |
| G | 45 | 45 | 10 |
| H | 45 | 50 | 5 |
| J | 35 | 50 | 15 |
| K | 35 | 55 | 10 |

Not only is it essential that the percentages of alumina, silica and zirconia (and modifying agent, if desired) fall within the above-described ranges but also it is essential that there be excluded from the composition any substantial amounts of impurities that interfere with or prevent the formation of fibrous material in satisfactory quantity or of acceptable quality. For this reason, the raw materials used for making the fibrous compositions of the present invention should be relatively pure and free from impurities.

One satisfactory source of alumina for carrying out the present invention is that sold by the Aluminum Company of America as Tabular Alumina designated as T-61 and having the following composition:

| | Percent |
| --- | --- |
| $Al_2O_3$ | 99.5+ |
| $SiO_2$ | .02 |
| $Na_2O$ | .02 |
| $Fe_2O_3$ | .03 |
| $TiO_2$ | .005 |

A less expensive source of alumina which has been found satisfactory for the purposes of the present invention is that sold by the Aluminum Company of America as A-1 Grade White Alumina Ore of which the following is a typical chemical analysis:

| | Percent |
| --- | --- |
| $Al_2O_3$ | 98.89 |
| $SiO_2$ | .03 |
| $Na_2O$ | .55 |
| $Fe_2O_3$ | .03 |
| $TiO_2$ | .004 |
| $H_2O$ (combined) | .50 |
| $H_2O$ (free) | 1.25 |

The source of material for silica may be a high purity flint or white sand. Or, if desired, a high purity alumina-silica clay or bauxite may be used as the source of all or part of the alumina or silica. The source of zirconia may be any high purity zirconia. Or, if desired, the source of zirconia and part of the silica may be high purity zircon sand.

When borax glass is desired in the refractory fibrous material, it may be added in quantities up to 6 parts by weight of borax glass ($Na_2B_4O_7$) to every 100 parts by combined weights of alumina, silica and zirconia. Alternatively, borax or sodium oxide plus boric oxide may be added in the required amounts to provide the desired amount of borax glass.

Certain materials other than borax glass may be included as modifying agents in the compositions of the present invention. Among the materials found to be satisfactory are aluminum chloride, sodium carbonate, potassium chloride, potassium fluoride, potassium phosphate and zinc oxide. When one or more of these materials are used, it is desirable that a small amount of sodium oxide such as that provided as an impurity in an alumina such as A-1 grade of alumina hereinabove set forth be included in the raw mix.

In order that the invention may be more clearly understood, the following examples are given of the practice of the present invention:

Example 1

A raw batch of the following composition was prepared:

| | Parts by weight |
| --- | --- |
| A-1 Grade White Alumina Ore | 42.75 |
| White sand | 49.75 |
| Zircon | 7.5 |

The above composition after thorough mixing was fused in an arc furnace of the type commonly used for making alumina abrasive materials until a substantial bath of molten material was obtained. The furnace was then tilted to allow the molten material to pour from the furnace in the form of a small stream that impinged on the periphery of one of two 12″ rotors that were rotating at about 4200 R. P. M. The axes of the two rotors were substantially parallel with about ⅜″ space between the peripheries of the two rotors. The stream of molten material was dissipated in the form of fine fibrous material that was highly suited for forming into bats, blankets and the like.

The following is a typical chemical analysis of the resulting fibrous material:

| | Percent |
| --- | --- |
| Alumina | 42.75 |
| Silica | 52.25 |
| Zirconia | 5.0 |

The yield in volume per unit time of fibrous material was extremely high, being about 6.5 cubic feet per minute. The resultant fibrous material had an average fiber diameter of only about 4 microns and an extremely low bulk density of only 0.72 lb. per cubic foot. An extremely high percentage of the fibrous material was in the form of long fibers up to 6″ in length. The resulting fibrous material was highly refractory in character, withstanding temperatures as high as 1400° C. over protracted periods of time. As a test to demonstrate the ability of the fibrous material to resist breakdown at elevated temperatures small mounds of the resulting fibrous material approximately 2″ in diameter and 1″ high were placed on a bonded silicon carbide slab coated with a flint wash 1/16″ thick, put in an electrically heated furnace and held at a temperature of 1100° C. for 2 hours. Examination of the fibrous material upon cooling after the test showed that it had stood up under the test and in large measure had retained its springiness and resilience.

This fibrous material, because of the absence of boron in its composition, is highly suited for uses requiring an inorganic refractory material containing no neutron-trapping elements.

Example 2

A raw batch identical with the raw batch described in Example 1, but including also 2 parts by weight of borax glass was prepared and fiberized in the manner described in Example 1.

A very high yield, about 5.5 cubic feet per minute, of extremely satisfactory fibrous material having a bulk density of 0.88# per cubic foot, an average fiber diameter of about 5 microns, and an extremely high percentage of long fibers up to 6″ in length was produced. A mound of this fibrous material, upon subjection to the test described in Example 1, retained in a large measure its springiness and resilience, showing it to be highly suitable for use in high temperature applications. This fibrous material, because of the presence of borax glass, is not as satisfactory as the material of Example 1 for uses requiring a minimum of neutron-trapping elements. Nevertheless, for other uses the composition of Example 2 is highly satisfactory.

Example 3

In order to investigate thoroughly the spinning of fibrous material from compositions both within and outside of the range of compositions falling within the scope of the present invention, 12 test runs were made following the procedure set forth in Examples 1 and 2 employing various compositions. Points 1 through 12 on the drawing correspond to runs 1 through 12 of this example, as listed in Table II below, except that in certain of the runs two parts by weight of borax glass was included in the raw mix in addition to the 100 parts by weight total of alumina, silica and zirconia. It is to be noted that run 9 depicts the results to be obtained when spinning fibrous material from the preferred composition of the aforementioned Patent No. 2,557,834, and run 8 demonstrates the results to be obtained when spinning fiber from the composition of Example 3 of that patent.

TABLE II

| Run | Composition, Parts by Weight [1] | | | Fiber Yield, Cu¹/Min. | Bulk Density, Lbs./Cu¹ | Ave. Dia., Microns | Appearance |
|---|---|---|---|---|---|---|---|
| | $Al_2O_3$ | $SiO_2$ | $ZrO_2$ | | | | |
| 1 | 48.75 | 48.75 | 2.5 | 1.57 | 1.26 | 4 | relatively silky; high percentage of very long fibers. |
| 2 | 45.00 | 45.00 | 10 | 2.11 | 1.17 | 5 | very silky; very high percentage of very long fibers. |
| 3 | 40.00 | 40.00 | 20 | 1.80 | 1.50 | 4 | Do. |
| 4 | 52.25 | 42.75 | 5 | 1.28 | 0.79 | 5 | non-silky; low percentage of long fiber. |
| 5 [2] | 42.75 | 52.25 | 5 | 5.55 | 0.88 | 5 | non-silky; fairly high percentage of long fibers. |
| 6 | 40.00 | 55.00 | 5 | 3.53 | 1.03 | 7 | Do. |
| 7 | 37.50 | 52.50 | 10 | 7.63 | 0.69 | 5 | Do. |
| 8 [3] | 50.00 | 42.50 | 7.5 | 0.71 | 1.84 | 5 | very silky; high percentage of very long fibers. |
| 9 [4] | 50.00 | 50.00 | 0 | 2.33 | 1.21 | 6 | non-silky; low percentage of long fibers. |
| 10 | 48.75 | 40.00 | 11.25 | 1.00 | .81 | | silky, long fibers. |
| 11 | 15.00 | 65.00 | 20.00 | 0.00 | | | unable to fuse bath satisfactorily to produce fiber. |
| 12 | 25.00 | 55.00 | 20.00 | | | | somewhat coarse fiber; high percentage of long fibers. |

[1] All compositions also contain 2 parts by weight borax glass, except runs 11 and 12.
[2] Per Example 2, above.
[3] Composition of Patent No. 2,557,834 (Example 3).
[4] Preferred composition of Patent No. 2,557,834.

Referring now to Table II above, run Nos. 2, 3, 5, 6, 7 and 12 demonstrate the results to be obtained by the practice of the present invention, whereas run Nos. 1, 4, 8, 9, 10 and 11 depict the results to be obtained when spinning fibers from certain compositions outside the scope of the present invention.

Runs 2 and 3 show that when very silky long fibers are desired, the silica to alumina ratio should be about 1. However, as is shown by run 10, when the silica to alumina ratio drops below 1, the fiber yield becomes too low to be commercially practical. Consequently, in accordance with the present invention the silica to alumina ratio is maintained at least equal to 1.

Run 11 shows that a silica content of 65% is too high. Because of the extremely high resistance of a molten bath of this composition, a satisfactory molten stream of this material could not be released for fiberizing. Consequently this composition falls outside the range of the compositions of the present invention.

Runs 5, 6 and 7 fall within the preferred range, comprising 50 to 55 percent silica, 35 to 45 percent alumina, and 3½ to 15 percent zirconia with the silica to alumina plus zirconia ratio equal to at least 1. The extremely high yields of spun fiber obtainable by fiberizing compositions within this range are particularly noteworthy, and make these compositions highly suited to the commercial production of spun fiber that is highly satisfactory for fabricating into blankets and the like.

The present invention has been discussed primarily as it pertains to the manufacture of spun fiber since these compositions find greatest utility for this use. Nevertheless, it is to be understood that the compositions of the present invention are likewise adaptable to the manufacture of blown fiber. Consequently, it is not intended to limit the scope of the present invention to compositions for and the manufacture of spun fiber.

Having described the invention it is intended to claim:

1. An inorganic fiber material consisting essentially of 40 to 60 percent by weight silica, 20 to less than 45 percent by weight alumina and 3½ to 20 percent by weight zirconia, the silica to alumina ratio by weight being at least 1.

2. An inorganic fibrous material consisting essentially of 40 to 55 percent by weight silica, 25 to less than 45 percent by weight alumina and 3½ to 20 percent by weight zirconia, the silica to alumina ratio by weight being at least 1.

3. An inorganic fibrous material consisting essentially of 50 to 55 percent by weight silica, 35 to 45 percent by weight alumina and 3½ to 15 percent by weight zirconia, the silica to alumina plus zirconia ratio by weight being at least 1.

4. An inorganic fibrous material consisting essentially of 40 to 60 percent silica, 20 to less than 45 percent by weight alumina, 3½ to 20 percent by weight zirconia and up to 6 percent by weight of a modifying agent selected from the group consisting of borax glass, aluminum chloride, sodium carbonate, potassium chloride, potassium fluoride, potassium phosphate, and zinc oxide, the silica to alumina ratio by weight being at least 1.

5. An inorganic fibrous material consisting essentially of 40 to 55 percent by weight silica, 25 to less than 45 percent alumina, 3½ to 20 percent by weight zirconia and up to 6 percent by weight of a modifying agent selected from the group consisting of borax glass, aluminum chloride, sodium carbonate, potassium chloride, potassium fluoride, potassium phosphate, and zinc oxide, the silica to alumina ratio by weight being at least 1.

6. An inorganic fibrous material consisting essentially of 50 to 55 percent by weight silica, 35 to 45 percent alumina, 3½ to 15 percent by weight zirconia and up to 6 percent by weight of a modifying agent selected from the group consisting of borax glass, aluminum chloride, sodium carbonate, potassium chloride, potassium fluoride, potassium phosphate, and zinc oxide, the silica to alumina plus zirconia ratio by weight being at least 1.

7. An inorganic fibrous material consisting essentially of 40 to 60 percent by weight silica, 20 to less than 45 percent alumina, 3½ to 20 percent by weight zirconia and up to 6 percent by weight borax glass, the silica to alumina ratio by weight being at least 1.

8. An inorganic fibrous material consisting essentially of 40 to 55 percent by weight silica, 25 to less than 45 percent alumina, 3½ to 20 percent by weight zirconia and up to 6 percent by weight borax glass, the silica to alumina ratio by weight being at least 1.

9. An inorganic fibrous material consisting essentially of 50 to 55 percent by weight silica, 35 to 45 percent alumina, 3½ to 15 percent by weight zirconia and up to 6 percent by weight borax glass, the silica to alumina ratio by weight being at least 1.

10. A raw batch for making inorganic fibrous material consisting essentially of 40 to 60 percent by weight silica, 20 to less than 45 percent by weight alumina and 3½ to 20 percent by weight zirconia, the silica to alumina ratio by weight being at least 1.

11. A raw batch for making inorganic fibrous material consisting essentially of 40 to 55 percent by weight silica, 25 to less than 45 percent by weight alumina and 3½ to 20 percent by weight zirconia, the silica to alumina ratio by weight being at least 1.

12. A raw batch for making inorganic fibrous material consisting essentially of 50 to 55 percent by weight silica, 35 to 45 percent by weight alumina and 3½ to 15 percent by weight zirconia, the silica to alumina zirconia ratio by weight being at least 1.

13. A raw batch for making inorganic fibrous material consisting essentially of 40 to 60 percent by weight silica, 20 to less than 45 percent by weight alumina, 3½ to 20 percent by weight zirconia and up to 6 percent by weight of a modifying agent selected from the group consisting of borax glass, aluminum chloride, sodium carbonate, potassium chloride, potassium fluoride, potassium phosphate, and zinc oxide, the silica to alumina ratio by weight being at least 1.

14. A raw batch for making inorganic fibrous material consisting essentially of 40 to 55 percent by weight silica, 25 to less than 45 percent by weight alumina, 3½ to 20 percent by weight zirconia and up to 6 percent of a modifying agent selected from the group consisting of borax glass, aluminum chloride, sodium carbonate, potassium chloride, potassium fluoride, potassium phosphate, and zinc oxide, the silica to alumina ratio by weight being at least 1.

15. A raw batch for making inorganic fibrous material consisting essentially of 50 to 55 percent by weight silica, 35 to 45 percent by weight alumina, 3½ to 15 percent by weight zirconia and up to 6 percent of a modifying agent selected from the group consisting of borax glass, aluminum chloride, sodium carbonate, potassium chloride, potassium fluoride, potassium phosphate, and zinc oxide, the silica to alumina plus zirconia ratio by weight being at least 1.

References Cited in the file of this patent

UNITED STATES PATENTS 2,557,834     McMullen _____ June 19, 1951

OTHER REFERENCES

The Glass Industry, vol. 21, pages 309–311 and 332 (July 1940); Glass Melts in the Systems Zirconia-Alumina-Silica and Titania-Alumina-Silica."

UNITED STATES PATENT OFFICE
CERTIFICATE OF CORRECTION

Patent No. 2,873,197 February 10, 1959

John C. McMullen

It is hereby certified that error appears in the above numbered patent requiring correction and that the said Letters Patent should read as corrected below.

Column 2, line 52, for "falliung" read -- falling --; column 3, line 53, strike out "of"; line 74, for "grade" read -- Grade --; column 6, lines 48 (first occurrence), 57 (first occurrence), 64 (second occurrence), and 73 (first occurrence) and column 7, lines 3 (first occurrence) and 7 (second occurrence), after "percent", each occurrence, insert -- by weight --.

Signed and sealed this 9th day of October 1962.

(SEAL)
Attest:

ERNEST W. SWIDER
Attesting Officer

DAVID L. LADD
Commissioner of Patents